(12) United States Patent
Gan et al.

(10) Patent No.: US 11,903,068 B2
(45) Date of Patent: Feb. 13, 2024

(54) MULTI-LINK COMMUNICATION METHOD AND APPARATUS

(71) Applicant: Huawei Technologies Co., Ltd., Shenzhen (CN)

(72) Inventors: Ming Gan, Shenzhen (CN); Yifan Zhou, Shenzhen (CN); Yunbo Li, Shenzhen (CN); Yuchen Guo, Shenzhen (CN); Jian Yu, Shenzhen (CN); Dandan Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/338,830

(22) Filed: Jun. 21, 2023

(65) Prior Publication Data

US 2023/0337308 A1    Oct. 19, 2023

Related U.S. Application Data

(63) Continuation of application No. 17/931,312, filed on Sep. 12, 2022, which is a continuation of application No. PCT/CN2021/080083, filed on Mar. 10, 2021.

(30) Foreign Application Priority Data

Mar. 13, 2020  (CN) .......................... 202010177787.4

(51) Int. Cl.
*H04W 76/15* (2018.01)
*H04W 56/00* (2009.01)

(52) U.S. Cl.
CPC ......... *H04W 76/15* (2018.02); *H04W 56/001* (2013.01)

(58) Field of Classification Search
CPC ............................ H04W 76/15; H04W 56/001
See application file for complete search history.

(56) References Cited

U.S. PATENT DOCUMENTS

| | | | |
|---|---|---|---|
| 2018/0092039 A1 | 3/2018 | Cariou et al. | |
| 2018/0160370 A1* | 6/2018 | Alpert | H04W 52/0225 |
| 2019/0158413 A1 | 5/2019 | Patil et al. | |
| 2019/0215884 A1* | 7/2019 | Patil | H04W 52/0219 |
| 2019/0230545 A1* | 7/2019 | Liou | H04W 24/10 |

(Continued)

FOREIGN PATENT DOCUMENTS

| | | |
|---|---|---|
| CN | 108449779 A | 8/2018 |
| EP | 2811806 B1 | 9/2018 |
| JP | 2012531817 A | 12/2012 |

OTHER PUBLICATIONS

Huang, P.-K., "Extremely Efficient Multi-band Operation", IEEE 802.11-19/0822r7, May 12, 2019, 30 pages.

(Continued)

*Primary Examiner* — Kyaw Z Soe
(74) *Attorney, Agent, or Firm* — Slater Matsil, LLP

(57) ABSTRACT

A STA in a STA MLD sends an information frame on a link corresponding to the station, and the information frame is used to indicate a STA in an awake state in the STA MLD. An AP MLD receives the information frame, and sends a downlink message frame on a one or more links corresponding to a part of or all of STAs in the awake state in the STA MLD, to assist the part of or all of the stations in fast accessing a channel without waiting for a NAVSyncDelay time period.

12 Claims, 4 Drawing Sheets

(56) References Cited

U.S. PATENT DOCUMENTS

2021/0274438 A1* 9/2021 Guan ................ H04W 52/0216

OTHER PUBLICATIONS

Cariou, L. et al., "Multi-link: steps for using a link", IEEE 802.11-19/1924r0, Nov. 16, 2019, 23 pages.
IEEE P802.11axD6.0, Nov. 2019, Draft Standard for Information technology—Telecommunications and information exchange between systems Local and metropolitan area networks—Specific requirements, Part 11: Wireless LAN Medium Access Control (MAC) and Physical Layer (PHY) Specifications, 780 pages.
IEEE Std 802.Nov. 2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, 3534 pages.
Kim, R.Y. et al., "Issues on MLD Power Saving", IEEE 802.11-20/1402r1, Sep. 4, 2020, 13 pages.
Taewon Song (LG Electronics), Multi-link Management, IEEE 802.11-19/1943r3, Mar. 5, 2020, 17 pages.
Taewon Song (LG Electronics), Multi-link Management, IEEE 802.11-19/1943r2, Jan. 16, 2020, 14 pages.

* cited by examiner

MULTI-LINK COMMUNICATION METHOD AND APPARATUS

CROSS-REFERENCE TO RELATED APPLICATIONS

This application is a continuation of U.S. patent application Ser. No. 17/931,312, filed on Sep. 12, 2022, which is a continuation of International Application No. PCT/CN2021/080083, filed on Mar. 10, 2021, which claims priority to Chinese Patent Application No. 202010177787.4, filed on Mar. 13, 2020. All of the afore-mentioned patent applications are hereby incorporated by reference in their entireties.

TECHNICAL FIELD

Embodiments of this application relate to the communication field, and in particular, to a multi-link communication method and an apparatus.

BACKGROUND

During formulation of 802.11ax in 2017, the Federal Communications Commission (FCC) opened a new free frequency band 5925-7125 MHz, where the frequency band is referred to as 6 GHz below. Therefore, 802.11ax standard workers extend a working range of 802.11ax devices from 2.4 GHz and 5 GHz to 2.4 GHz, 5 GHz, and 6 GHz in the 802.11ax project authorization requests (PAR).

In the next-generation Wi-Fi extremely high throughput (EHT) protocol of IEEE 802.11ax, in addition to using a continuous ultra-large bandwidth of the new frequency band of 6 GHz, discontinuous multi-links may also be aggregated by using a multi-link cooperation technology to form an ultra-large bandwidth. Correspondingly, a multi-link device (MLD) appears, and frequency bands on which the multi-link device operates are all or a part of sub 1 GHz, 2.4 GHz, 5 GHz, 6 GHz, and a high frequency of 60 GHz.

For various reasons, channel state information on some links of the multi-link device is lacked. After a station (STA) or an access point (AP) on a link on which channel state information is lacked changes from a sleep state to an awake state, the station or the AP needs to wait for a NAVSyncDelay time period before the station or the AP preempts a channel. Alternatively, a STA or an AP that changes from a sleep state to an awake state needs to receive a data packet including NAV information, and waits for expiration of the NAV information before the STA or the AP starts to preempt a channel. In this way, a delay in sending data by the STA or the AP is relatively large, and power consumption of the STA or the AP is wasted.

SUMMARY

Embodiments of this application provide a multi-link communication method and an apparatus. A STA in a STA MLD sends an information frame on a link corresponding to the station, and the information frame is used to indicate a STA in an awake state in the STA MLD. An AP MLD receives the information frame, and sends a downlink message frame on one or more links corresponding to a part of or all of STAs in the awake state in the STA MLD, to assist the part of or all of the stations in fast accessing a channel without waiting for a NAVSyncDelay time period. In this way, time efficiency of accessing the channel by the awake STA is improved, and power consumption of the awake STA is reduced.

According to a first aspect, an embodiment of this application provides a multi-link communication method, including: a station in a station multi-link device sends an information frame on a link corresponding to the station, where the information frame is used to indicate one or more stations in an awake state in the station multi-link device; and a part of or all of stations in the awake state in the station multi-link device receives, on one or more links corresponding to the part of or all of the stations, a downlink message frame sent by an access point multi-link device.

According to a second aspect, an embodiment of this application provides a multi-link communication method, including: an access point multi-link device receives an information frame on a link corresponding to a station, where the information frame is used to indicate one or more stations in an awake state in a station multi-link device; and the access point multi-link device sends a downlink message frame on one or more links corresponding to a part of or all of stations in the awake state in the station multi-link device.

According to a third aspect, an embodiment of this application provides a multi-link communication method, including: a station in a sending state in a station multi-link device sends an information frame on a link corresponding to the station, where the information frame is used to indicate stations to which the station multi-link device is to switch for sending data, or the information frame is used to indicate links to which the station multi-link device is to switch for sending data; and all or a part of the stations indicated by the information frame receives, on a corresponding link, a synchronization frame sent by an access point multi-link device, where the synchronization frame is used to assist all or the part of the stations in sending an uplink service.

According to a fourth aspect, an embodiment of this application provides a multi-link communication method, including: an access point multi-link device receives, on one link, an information frame sent by a station in a sending state in a station multi-link device, where the information frame is used to indicate stations to which the station multi-link device is to switch for sending data, or the information frame is used to indicate links to which the station multi-link device is to switch for sending data; and the access point multi-link device sends a synchronization frame on a part of or all of the links indicated by the information frame, or on one or more links corresponding to all or a part of the stations indicated by the information frame, where the synchronization frame is used to assist all or the part of the stations in sending an uplink service.

According to a fifth aspect, an embodiment of this application provides a multi-link communication method, including: a single radio station sends an information frame on a transmit link, where the information frame is used to indicate a target link and a switching delay of the single radio station, the target link indicates a link to which the single radio station is to switch, and the switching delay indicates how long the single radio station needs to wait for before the single radio station can work on the switched target link; and the single radio station receives a synchronization frame on the target link after the switching delay, where the synchronization frame is used to assist a station in the single radio station in quickly accessing a channel on the target link, and the station is a station corresponding to the target link.

According to a sixth aspect, an embodiment of this application provides a multi-link communication method, including: an access point multi-link device receives, on a link, an information frame sent by a single radio station, where the information frame is used to indicate a target link and a switching delay of the single radio station, the target link indicates a link to which the single radio station is to switch, and the switching delay indicates how long the single radio station needs to wait for before the single radio station can work on the switched target link; and the access point multi-link device sends a synchronization frame on the target link after the switching delay, where the synchronization frame is used to assist a station in the single radio station in quickly accessing a channel on the target link, and the station is a station corresponding to the target link.

According to a seventh aspect, an embodiment of this application provides a computer-readable storage medium, configured to store a computer program, where the computer program includes instructions used to perform any one of the first aspect to the sixth aspect.

According to an eighth aspect, an embodiment of this application provides a computer program, where the computer program includes instructions used in any one of the first aspect to the sixth aspect.

DETAILED DESCRIPTION OF ILLUSTRATIVE EMBODIMENTS

The following describes technical solutions in embodiments of this application with reference to the accompanying drawings in the embodiments of this application.

(I)

First, terms and abbreviations that may be used in the embodiments of this application are described. For terms and abbreviations that may be used in the embodiments of this application, refer to the following table.

| English abbreviation | Full expression in English/Standard term in English | Chinese expression/ Chinese term |
| --- | --- | --- |
| AP | Access Point | Access point |
| STA | Station | Station |
| DL | Downlink | Downlink |
| UL | Uplink | Uplink |
| MLD | Multi-link device | Multi-link device |
| STA MLD | STA multi-link device | Station multi-link device |
| AP MLD | AP multi-link device | Access point multi-link device |

(II)

Then, a communication system to which the embodiments of this application may be applied is described, for example, a Wi-Fi wireless communication system, a global system of mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, other future evolved systems, various other wireless communication systems using a radio access technology, or the like.

The communication system includes a network device and at least one terminal device located in a coverage area of the network device. The network device may provide communication coverage for a specific geographic area, and communicate with a terminal device located in the coverage area. The network device may be an access point AP in the Wi-Fi wireless communication system, may be a base transceiver station (BTS) in the GSM system or the code division multiple access (CDMA) system, may be a NodeB (NB) in the WCDMA system, may be an evolved NodeB (eNB or eNodeB) in the LTE system, may be a radio controller in a cloud radio access network (CRAN), or may be a relay station, a vehicle-mounted device, a wearable device, a network side device in a future network, or the like. The terminal device may be mobile or fixed, and the terminal device may be a station STA, an access terminal, user equipment (UE), a subscriber unit, a subscriber station, a mobile station, a remote station, a remote terminal, a mobile device, a user terminal, a wireless communication device, a user agent, a user apparatus, or the like.

Figure 1:
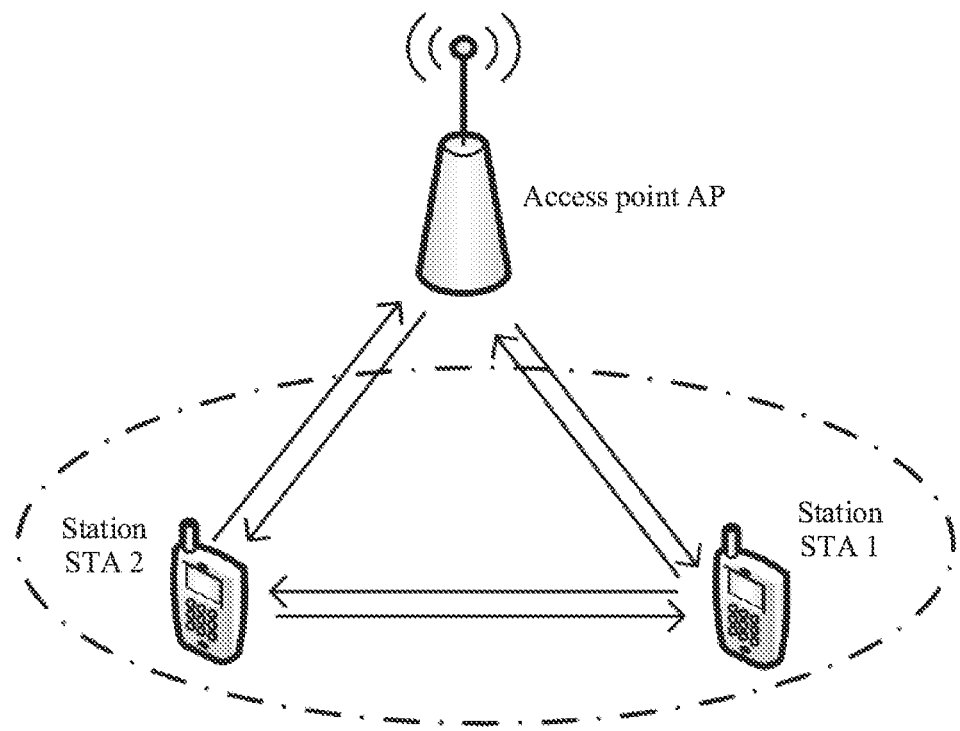
FIG. 1 shows a Wi-Fi wireless communication system.

FIG. 1 shows a Wi-Fi wireless communication system. As shown in FIG. 1, the network device is an access point AP, the terminal device is a station STA, and communication in the Wi-Fi wireless communication system includes uplink communication, downlink communication, D2D communication, and the like.

With the introduction of a multi-link cooperation technology, both the AP and the STA in the Wi-Fi wireless communication system are upgraded to multi-link devices. The following describes a multi-link device.

As the name implies, a communication device operating on a plurality of links is referred to as a multi-link device, and a plurality of frequency bands or a plurality of channels are collectively referred to as multi-links. For example, the plurality of frequency bands include all or a part of sub 1 GHz, 2.4 GHz, 5 GHz, 6 GHz, and a high frequency of 60 GHz. For example, the plurality of channels may be channels divided based on any frequency band, for example, a 160 MHz channel, an 80 MHz channel, a 40 MHz channel, and a 20 MHz channel on the 5 GHz frequency band.

(III)

Figure 2:
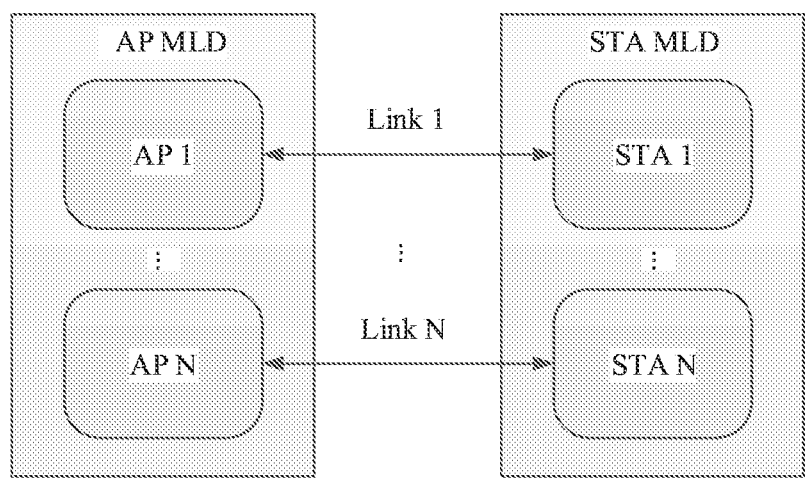
FIG. 2 is a diagram of a communication system for communication between multi-link devices MLDs.

FIG. 2 is a diagram of a communication system in which communication is performed between multi-link devices MLDs. FIG. 2 uses only a communication system including an AP multi-link device (AP MLD) and a STA multi-link device (STA MLD) as an example. It should be understood that a communication system including multi-link devices MLDs is not limited thereto. For example, the communication system including the multi-link devices MLDs may alternatively be a communication system including an AP multi-link device 1 (AP MLD 1) and an AP multi-link device 2 (AP MLD 2) or a communication system including a STA multi-link device 1 (STA MLD 1) and a STA multi-link device 2 (STA MLD 2).

As shown in FIG. 2, the AP MLD includes one or more APs (an AP 1, an AP 2, . . . , an AP N), the STA MLD includes one or more STAs (a STA 1, a STA 2, . . . , a STA N), and a plurality of links (a link 1, a link 2, . . . , a link N) exist between the AP MLD and the STA MLD, where a communication link between the AP 1 and the STA 1 is the link 1; a communication link between the AP 2 and the STA 2 is the link 2; . . . ; a communication link between the AP N and the STA N is the link N.

(IV)

The following describes the embodiments of this application by using FIG. 2 as an example. It should be understood that the embodiments of this application are not limited to the MLD communication system shown in FIG. 2, and the embodiments of this application are further applicable to various other MLD communication systems.

1. STA MLD in an Energy Saving Mode

One or more STAs in a STA MLD may be in an energy saving mode, and STAs operating on different links in the STA MLD cannot always listen to a channel state information. Consequently, a STA that does not listen to a channel state information loses channel state information of a link of the STA. When the STA changes from a sleep state to an awake state, the STA needs to wait for a NAVSyncDelay time period before the STA starts to preempt a channel, or the STA receives a frame that can set an NAV for the STA, and can preempt a channel only after the NAV expires.

The embodiments of this application provide multi-link communication methods 1.1 and 1.2. A STA in the STA MLD sends an information frame on a link corresponding to the station, and the information frame is used to indicate a STA in the awake state in the STA MLD. An AP MLD receives the information frame, and sends a downlink message frame on one or more links corresponding to a part of or all of STAs in the awake state in the STA MLD, to assist the part of or all of the stations in fast accessing a channel without waiting for the NAVSyncDelay time period, or receiving the frame that can set the NAV for the part or all of the stations. In this way, time efficiency of accessing the channel by the awake STA is improved, and power consumption of the awake STA is reduced.

1.1. A Multi-Link Communication Method, Including the Following Steps.

S110: A station in a station multi-link device sends an information frame on a link corresponding to the station, where the information frame is used to indicate one or more stations in an awake state in the station multi-link device.

In step S110, the station in the awake state in the station multi-link device includes a station that changes from a sleep state to the awake state.

In step S110, the information frame carries an association identifier (AID) of the station in the awake state, or the information frame carries a link identifier bitmap corresponding to the station in the awake state, or the information frame carries a link identifier corresponding to the station in the awake state, to indicate the station in the awake state in the station multi-link device. Each bit of the link identifier bitmap corresponds to a link or a station on a link. If the bit is set to a first value, for example, 1, it indicates that a station on a corresponding link is awake. If the bit is set to a second value, for example, 0, it indicates that a station on a corresponding link is not awake. The link identifier may be an identification number, an operation set and a channel number, a MAC address of a station, or a combination thereof. The link identifier is formed as follows. For example, when a AP multi-link device establishes a BSS, a management frame, for example, a beacon frame, sent by the AP multi-link device carries an element, including a plurality of link identification information fields, and each link identification information field includes a link identifier and one or more of a MAC address, an operation set, and a channel number. Alternatively, in a multi-link establishment process, a AP multi-link device and the station multi-link device negotiate a plurality of link identification information fields. In subsequent communication, the AP multi-link device or the station multi-link device uses the link identifier, including one or more attributes of the MAC address of the station, the working operation set, and the channel number, to represent a station or a logical station in the multi-link device. The MAC address may also be replaced with an association identifier of the AP multi-link device associated with the station.

The information frame may be a PS-Poll frame or a QoS null data frame. For example, in an APSD (automatic power save delivery) energy saving mechanism including unscheduled APSD and scheduled APSD, the information frame may further carry the link identification bitmap in a trigger frame (which is the QoS null data frame in the mechanism), to indicate one or more stations in the awake state in the station multi-link device.

In step S110, optionally, the information frame does not indicate whether the station in the awake state has an uplink service or a downlink service.

In step S110, optionally, the information frame can further carry an uplink/downlink indication field, and the uplink/downlink indication field is used to indicate whether the station in the awake state has the uplink service or the downlink service. For example, the information frame indicates that a STA 2 and a STA 3 in the STA MLD are in the awake state, and the information frame may further carry an uplink/downlink indication field corresponding to the STA 2. The uplink/downlink indication field may be 1 bit. If the uplink/downlink indication field corresponding to the STA 2 is set to a first value, for example, 1, it indicates that the STA 2 has an uplink service to be sent; if the uplink/downlink indication field corresponding to the STA 2 is set to a second value, for example, 0, it indicates that the STA 2 has a downlink service to be received; if the STA 2 has both an uplink service and a downlink service, the uplink/downlink indication field is preferably set to a second value, or certainly may be set to a first value. The uplink/downlink indication field may alternatively be 2 bits. In addition to the foregoing first two cases, a third value may be added. If the uplink/downlink indication field corresponding to the STA 2 is set to the third value, it indicates that the STA 2 has both a downlink service to be received and an uplink service to be sent.

S111: A part of or all of stations in the awake state in the station multi-link device receive, on one or more links corresponding to the part of or all of the stations, a downlink message frame sent by an access point multi-link device. The part of or all of the stations in the awake state in the multi-link device may also be expressed as the one or more stations in the awake state in the multi-link device.

Method 1: The information frame in S110 does not indicate whether the station in the awake state has the uplink service or the downlink service.

In step S111, if the access point multi-link device has the downlink service for the station in the awake state in the station multi-link device, the access point multi-link device sends the downlink service, for example, a downlink data frame or a downlink management frame, on the corresponding link; if the access point multi-link device has no downlink service for the station in the awake state in the station multi-link device, the access point multi-link device sends a synchronization frame on the one or more links corresponding to the part of or all of the stations. Method 2: The information frame in S110 further carries the uplink/downlink indication field.

In step S111, if the uplink/downlink indication field indicates that the one or more stations have a downlink service, the access point multi-link device sends the downlink service on a corresponding link; if the uplink/downlink indication field indicates that the one or more stations have an uplink service, the access point multi-link device sends a synchronization frame on a link corresponding to the one or more stations; if the uplink/downlink indication field indicates that the one or more stations have both an uplink service and a downlink service, the access point multi-link device first sends the downlink service on a corresponding link, or the access point multi-link device first sends a synchronization frame on a corresponding link, to assist the one or more stations in sending the uplink service on the corresponding link.

In step S111, the synchronization frame is used to assist the station in the awake state in sending the uplink service. A method for sending a synchronization frame complies with an existing sending mechanism, for example, an EDCA channel preemption mechanism. For example, a trigger frame in 802.11ax is used to directly schedule the station in the awake state to send the uplink service. For another example, a data frame (including a QoS null frame), a CTS (clear to send) frame, a CTS to self frame, an RTS (Request to Send) frame, a CF-End frame, or the like is used, where value of duration field of the QoS null frame, the CTS frame, and the CTS to self frame are set to 0, and a duration field length of the RTS frame is equal to a sum of transmission time periods of an SIFS and a CTS frame. For example, a STA in the STA MLD notifies the AP MLD that the STA 2 in the STA MLD changes from the sleep state to the awake state, and an AP 2 in the AP MLD sends a synchronization frame on a link 2, where the synchronization frame is a trigger frame, and is used to directly schedule the STA 2 to send the uplink service, the scheduling may be single-user uplink transmission scheduling, or multi-user uplink transmission scheduling, for example, OFDMA and MU-MIMO, where a multi-user object includes the STA 2. After an SIFS time interval, the STA 2 in the STA MLD sends the uplink service on a frequency resource indicated by the trigger frame. For another example, a STA in the STA MLD notifies the AP MLD that the STA 2 in the STA MLD is in the awake state, and an AP 2 in the AP MLD sends a synchronization frame to the STA 2 on a link 2, where the synchronization frame is the RTS frame. The STA 2 in the STA MLD replies the CTS frame after an SIFS interval, and then sends the uplink service. For another example, a STA in the STA MLD notifies the AP MLD that the STA 2 in the STA MLD is in the awake state, and an AP 2 in the AP MLD sends a synchronization frame to the STA 2 on a link 2, where the synchronization frame is the CF-End frame. After receiving the CF-End frame, the STA 2 in the STA MLD obtains a channel transmission opportunity through channel contention, and then sends the uplink service.

It should be noted that before the AP MLD sends the synchronization frame on a link on which the awake station works, if the AP MLD detects that a channel is busy and a busy time period exceeds a NAVSyncDelay, the AP MLD does not need to send the synchronization frame. Specifically, in FIG. 3, the channel busy time period refers to a time period from a time point when the AP MLD receives a PS-Poll frame or another frame with the same function sent by a STA 1 to a time point when the AP MLD obtains a chance for sending the synchronization frame. Alternatively, the channel busy time period refers to a time period from a time point when the AP MLD sends a response acknowledgment frame to a time point when the AP MLD obtains a chance for sending the synchronization frame, where the response acknowledgment frame is of the AP MLD to a received PS-Poll frame or another received frame with the same function.

Alternatively, the channel busy time period refers to a time period from a time point when the AP MLD sends a response acknowledgment frame to a time point when the AP MLD obtains a transmission opportunity of the link 2 after the AP MLD detects that the link 2 is idle.

It should be understood that, after receiving the information frame, the access point multi-link device may send the downlink service on the corresponding link, or may send the synchronization frame on the one or more links corresponding to the part of or all of the stations. The access point multi-link device may send a downlink service frame/the downlink management frame and send the synchronization frame in two separate procedures or in two parts of one procedure.

Figure 3:
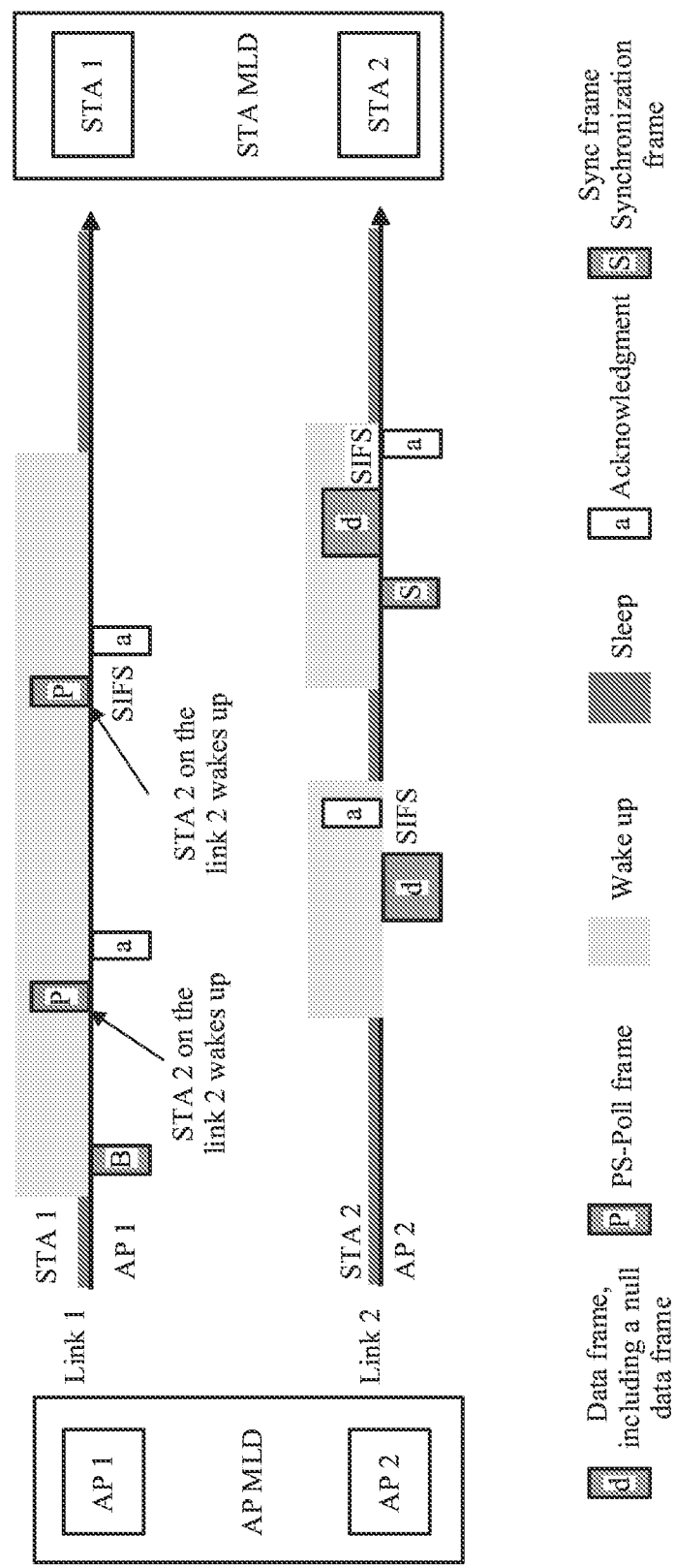
FIG. 3 shows a multi-link communication method of a STA MLD in an energy saving mode.

FIG. 3 is used as an example. After the AP MLD receives the information frame PS-Poll frame on a link 1, where the information frame PS-Poll indicates that the STA 2 in the STA MLD is in the awake state, for example, indicates that the STA 2 changes from the sleep state to the awake state, if the AP 2 in the AP MLD has a downlink service for the STA 2, the AP 2 in the AP MLD sends the downlink service to the STA 2 on the link 2.

FIG. 3 is used as an example. After the AP MLD receives the information frame PS-Poll on a link 1, where the information frame PS-Poll indicates that the STA 2 in the STA MLD is in the awake state, for example, indicates that the STA 2 changes from the sleep state to the awake state, if the AP 2 in the AP MLD has no downlink service for the STA 2, the AP 2 in the AP MLD sends a synchronization frame S to the STA 2 on the link 2, and the STA 2 sends the uplink service on the link 2 based on the synchronization frame.

If the AP 2 in the AP MLD has both the downlink service and the uplink service to the STA 2, after the AP MLD receives the information frame PS-Poll on the link 1, the AP 2 in the AP MLD may first send the downlink service to the STA 2 on the link 2. Alternatively, the AP 2 may first send the synchronization frame to the STA 2, and the STA 2 sends the uplink service on the link 2 based on the synchronization frame.

It should be understood that, to save power, the AP MLD may select one or more STAs in the STA MLD to periodically receive a beacon frame, without requiring all the STAs in the STA MLD to periodically wake up to receive a beacon frame. A TIM element of the beacon frame not only needs to indicate whether a STA on a link on which the beacon frame is transmitted has a downlink service, but also needs to indicate whether a STA on another link has a downlink service. A specific indication method is not limited in the present invention.

The foregoing describes this application from a perspective of the station multi-link device, and the following describes this application from a perspective of an access point multi-link device.

1.2. A Multi-Link Communication Method, Including the Following Steps.

S120: An access point multi-link device receives an information frame on a link corresponding to a station, where the information frame is used to indicate one or more stations in an awake state in a station multi-link device.

S121: The access point multi-link device sends a downlink message frame on one or more links corresponding to a part of or all of stations in the awake state in the station multi-link device.

It should be understood that for all technical details in the method 1.2, refer to all technical details recorded in the method 1.1, and details are not described herein again.

2. STA MLD that does not Support Simultaneous Transmitting and Receiving.

For a STA MLD that does not support simultaneous transmitting and receiving, when a STA in the STA MLD sends data, another STA cannot receive channel state information. Consequently, the channel state information (for example, NAV information) on a link corresponding to the another STA is lost.

When congestion occurs when the STA MLD sends data on a transmit link, the STA MLD needs to switch to another station to send data on a link of the another station. In this case, the another station does not know channel state information of the link. Consequently, the another station needs to wait for a NAVSyncDelay time period before starting to preempt a channel; or receives a frame that can set a NAV for the another station, and waits for ending of the NAV before starting to preempt a channel. This causes a relatively large delay in sending data by the STA that loses the channel state information, and power consumption of the STA is wasted.

The MLD that does not support simultaneous transmitting and receiving may be an MLD in which all stations cannot perform simultaneous transmitting and receiving or an MLD in which a part of stations cannot perform simultaneous transmitting and receiving.

In view of this, an embodiment of this application provides a multi-link communication method 2.1. The STA MLD that does not support simultaneous transmitting and receiving sends an information frame on a transmit link. The information frame is used to indicate a link to which the STA MLD is to switch for sending data, or the information frame is used to indicate a STA to which the STA MLD performs switching for sending data. After receiving the information frame, an AP MLD sends a synchronization frame on the indicated link, to assist a STA on the indicated link in quickly accessing a channel for sending the data.

2.1. A multi-link communication method, including the following steps.

S210: A station in a sending state in a station multi-link device sends an information frame on a link corresponding to the station, where the information frame is used to indicate a station to which the station multi-link device is to switch for sending data, or the information frame is used to indicate a link to which the station multi-link device is to switch for sending data.

S211: The station indicated by the information frame receives, on a corresponding link, a synchronization frame sent by an access point multi-link device, where the synchronization frame is used to assist all or a part of stations in sending an uplink service.

The method 2.1 is described below by using FIG. 4 as an example.

Figure 4:
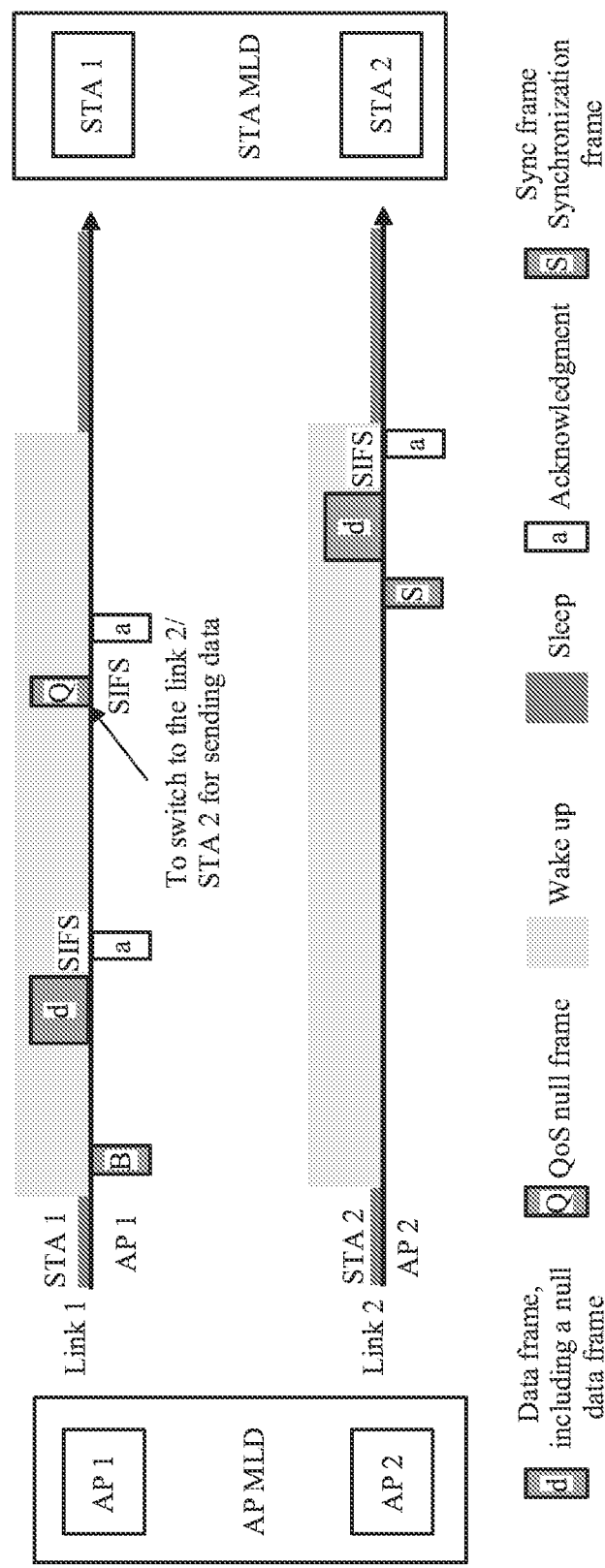
FIG. 4 shows a multi-link communication method of a STA MLD that does not support simultaneous transmitting and receiving.

As shown in FIG. 4, a STA 1 in the STA MLD is in the sending state, and the STA 1 sends the information frame (indicated by Q in FIG. 4) on a link 1 to the AP MLD. The information frame indicates the STA to which the STA MLD is to switch for sending the data, and the information frame may indicate the STA by carrying an identifier of the STA. Alternatively, the information frame is used to indicate the link to which the STA MLD is to switch for sending the data, and the information frame may indicate the link or a station on the link by carrying a link identifier or a link identifier bitmap. The information frame may be a QoS null data frame or a QoS data frame.

The AP MLD receives the information frame on the link 1, learns of the STA or the link to which the STA MLD is to switch, and sends the synchronization frame (indicated by S in FIG. 4) on the link indicated by the information frame or through the station indicated by the information frame. The synchronization frame is used to assist the part of or all of the stations in sending uplink services. For descriptions of the synchronization frame, refer to the descriptions of the synchronization frame in the foregoing method 1.1. It should be understood that all descriptions of the synchronization frame in 1.1 are applicable to the synchronization frame in the method 2.1. Details about the synchronization frame are not described herein again.

As shown in FIG. 4, in a specific embodiment, the STA 1 in the STA MLD is in the sending state, and the STA 1 sends the information frame (indicated by Q in FIG. 4) to the AP MLD on the link 1. The information frame indicates the STA 2 and the STA 3 to which the STA MLD is to switch for sending the data, or the information frame indicates the link 2 or the STA 2 to which the STA MLD is to switch for sending the data. After receiving the information frame, the AP MLD learns that the STA MLD is to switch to the STA 2/link 2 for sending the data, and the AP 2 in the AP MLD sends a synchronization frame on the link 2 to the STA 2 to assist the STA 2 in sending an uplink service. For the synchronization frame, refer to all descriptions of the synchronization frame in 1.1. Details are not described herein again. After receiving the synchronization frame, the STA 2 sends the uplink service on the link 2. For a case in which the STA 2 sends the uplink service on the link 2, refer to the corresponding part in 1.1. Details are not described herein again.

The foregoing describes the solution on a station multi-link device side. The following describes a solution on an access point multi-link device side.

2.2. A Multi-Link Communication Method, Including the Following Steps.

S220: An access point multi-link device receives, on one link, an information frame sent by a station in a station multi-link device, where the information frame is used to indicate a station to which the station multi-link device is to switch for sending data, or the information frame is used to indicate a link to which the station multi-link device is to switch for sending data.

S221: The access point multi-link device sends a synchronization frame on a link indicated by the information frame or to a station indicated by the information frame, where the synchronization frame is used to assist the station in sending an uplink service.

It should be understood that for all technical details in the method 2.2, refer to all technical details recorded in the method 2.1, and details are not described herein again. For a method for sending a synchronization frame, refer to all technical details recorded in the method 1.1. Details are not described herein again.

3. Single Radio Station

A single radio station can send and receive data only on one link, and cannot listen to channel state information of another link. In this case, if the single radio station is to switch to the another link for sending data, due to lack of the channel state information, even if a channel is idle, the single radio station needs to wait for a NAVSyncDelay time period before sending the data on the another link.

The single radio station includes a plurality of logical stations. Each logical station works on a link, but the plurality of logical stations share a same transmitter. That is, only one logical station can work at a same moment. The single radio station may be a single radio station in which all logical stations share one transmitter, or may be a single radio station in which a part of logical stations shares one transmitter.

In view of this, embodiments of this application provide multi-link communication methods 3.1 and 3.2. The single radio station notifies, by using an association request frame or another management frame, an AP MLD of a target link and a switching delay of the single radio station, where the target link indicates a link to which the single radio station is to switch, and the switching delay indicates how long the single radio station needs to wait for before the single radio station can work on the switched target link. After the AP MLD receives a link switching request of the single radio station, after the switching delay, the AP MLD sends a synchronization frame to the single radio station on the target link, where the synchronization frame is used to assist the single radio station in quickly accessing a channel on the target link. After receiving the synchronization frame, the single radio station sends data on the target link.

3.1. A Multi-Link Communication Method, Including the Following Steps.

S310: A single radio station sends an information frame on a transmit link, where the information frame is used to indicate a target link of the single radio station, and optionally, includes a switching delay, the target link indicates a link to which the single radio station is to switch, and the switching delay indicates how long the single radio station needs to wait for before the single radio station can work on the switched target link.

S311: The single radio station receives a synchronization frame on the target link after the switching delay, where the synchronization frame is used to assist a station in the single radio station in quickly accessing a channel on the target link, and the station is a station corresponding to the target link.

The method 3.1 is described below by using FIG. 5 as an example.

Figure 5:
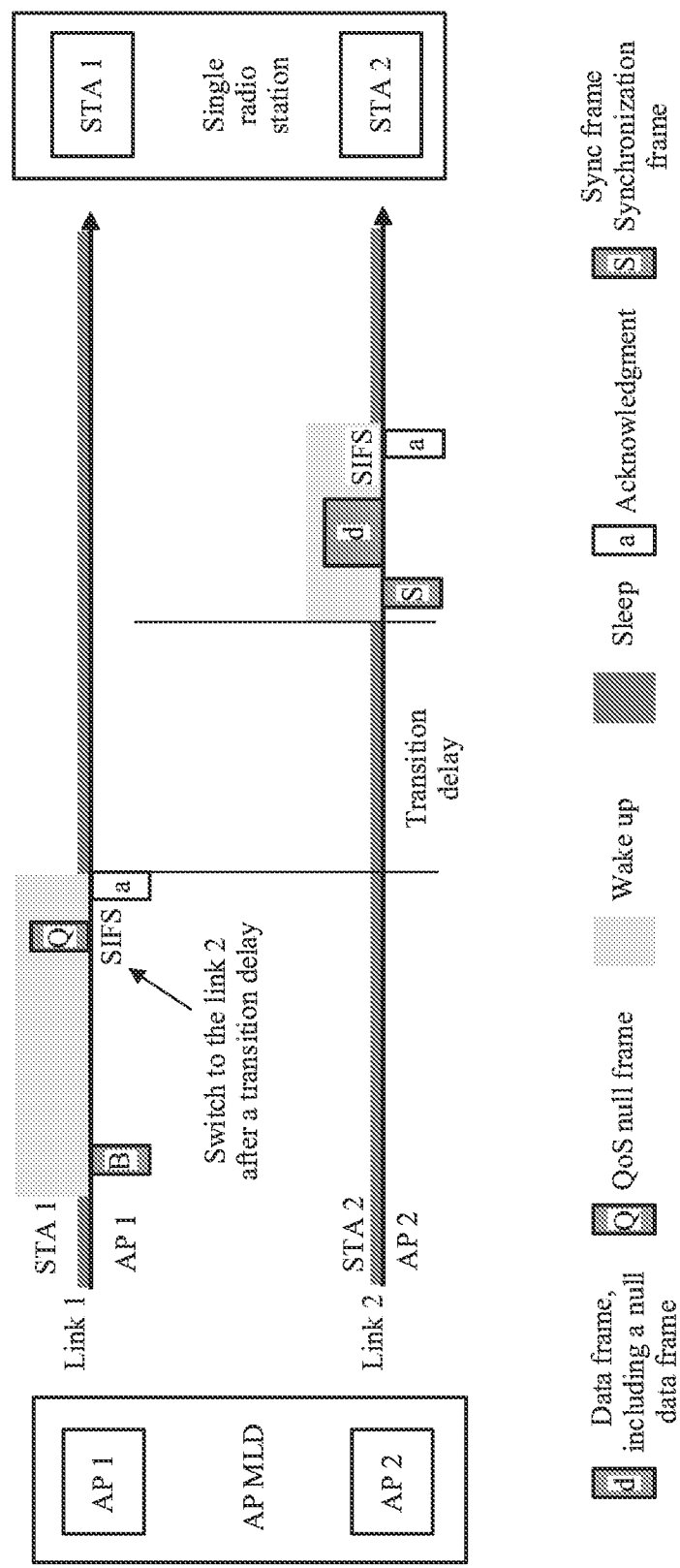
FIG. 5 shows a multi-link communication method of a single radio station.

As shown in FIG. 5, in an association phase or another phase, the single radio station notifies, by using a frame, for example, a management frame, an AP multi-link device of a value of a transition delay, or negotiates with the AP multi-link device about a value of a transition delay. The transition delay is used to indicate a time period required for the single radio station to switch from one link to another link for working, or a time period required to switch from one logical station to another logical station for working. The single radio station sends an information frame (indicated by Q in FIG. 5) on a link 1, where the information frame indicates a link 2. The link 2 is a link to which the single radio station is to switch, and the single radio station can work on the link 2 after the transition delay. The AP MLD receives the information frame on the link 1, and learns that a single radio station is to switch to the link 2, and can work on the link 2 after the transition delay. An AP 2 in the AP MLD sends a synchronization frame on the link 2 after the transition delay, where the synchronization frame is used to assist a STA in the single radio station in quickly accessing a channel on the link 2. For descriptions of the synchronization frame, refer to the descriptions of the synchronization frame in the foregoing method 1.1. It should be understood that all descriptions of the synchronization frame in 1.1 are applicable to the synchronization frame in the method 3.1. Details about the synchronization frame are not described herein again. The single radio station receives the synchronization frame on the link 2, and sends an uplink service on the link 2 based on the synchronization frame. For details of sending the uplink service on the link 2 based on the synchronization frame, refer to the descriptions in the method 1.1. Details are not described herein again.

The foregoing describes the solution on a single radio station side. The following describes a solution on an access point multi-link device side.

3.2. A Multi-Link Communication Method, Including the Following Steps.

S320: An access point multi-link device receives, on a link, an information frame sent by a single radio station, where the information frame is used to indicate a target link of the single radio station, and optionally, includes a switching delay, the target link indicates a link to which the single radio station is to switch, and the switching delay indicates how long the single radio station needs to wait for before the single radio station can work on the switched target link. The target link may be indicated by using a link identifier. The link identifier may be an identification number, an operation set and a channel number, a MAC address of a logical station, or a combination thereof. The link identifier is formed as follows. For example, when the AP multi-link device establishes a BSS, a management frame, for example, a beacon frame, sent by the AP multi-link device carries an element, including a plurality of link identification information fields, and each link identification information field includes a link identifier and one or more of a MAC address, an operation set, and a channel number. Alternatively, in a multi-link establishment process, the AP multi-link device and a station multi-link device negotiate a plurality of link identification information fields. In subsequent communication, the AP multi-link device or the station multi-link device uses the link identifier, including one or more attributes of the MAC address of the station, the working operation set, and the channel number, to represent a station or a logical station in the multi-link device. The MAC address may also be replaced with an association identifier of the AP multi-link device associated with the station.

S321: The access point multi-link device sends a synchronization frame on the target link after the switching delay, where the synchronization frame is used to assist a station in the single radio station in quickly accessing a channel on the target link, and the station is a station corresponding to the target link.

It should be understood that for all technical details in the method 3.2, refer to all technical details recorded in the method 3.1, and details are not described herein again. For a method for sending a synchronization frame, refer to all technical details recorded in the method 1.1. Details are not described herein again.

The foregoing describes a multi-link communication method in the embodiments of this application. The following describes a product in the embodiments of this application. The product includes a station multi-link device, an access point multi-link device, and a single radio station.

As shown in FIG. 2, the station multi-link device includes one or more stations, the access point multi-link device includes one or more access points, and one station and one access point form a link.

The following describes in detail the station multi-link device, the access point multi-link device, and the single radio station that are provided in the embodiments of this application.

An embodiment of this application provides a station multi-link device, where the station multi-link device includes one or more stations; a station in the station multi-link device sends an information frame on a link corresponding to the station, where the information frame is used to indicate one or more stations in an awake state in the station multi-link device; and a part of or all of stations in the awake state in the station multi-link device receives, on one or more links corresponding to the part of or all of the stations, a downlink message frame sent by an access point multi-link device.

It should be understood that the station multi-link device has any function of the station multi-link device in the foregoing method 1.1. For all technical details of the station multi-link device, refer to the method 1.1. Details are not described herein again.

An embodiment of this application further provides an access point multi-link device, where the access point multi-link device includes one or more access points; an access point in the access point multi-link device receives an information frame on a link corresponding to the access point, where the information frame is used to indicate one or more stations in an awake state in a station multi-link device; and the access point multi-link device sends a downlink message frame on one or more links corresponding to a part of or all of stations in the awake state in the station multi-link device.

It should be understood that the station multi-link device has any function of the station multi-link device in the foregoing method 1.2. For all technical details of the station multi-link device, refer to the method 1.2. Details are not described herein again.

An embodiment of this application provides a station multi-link device, where the station multi-link device includes one or more stations; a station in a sending state in the station multi-link device sends an information frame on a link corresponding to the station, where the information frame is used to indicate stations to which the station multi-link device is to switch for sending data, or the information frame is used to indicate links to which the station multi-link device is to switch for sending data; and all or a part of the stations, in the station multi-link device, indicated by the information frame receives, on a corresponding link, a synchronization frame sent by an access point multi-link device, where the synchronization frame is used to assist all or the part of the stations in sending an uplink service.

It should be understood that the station multi-link device has any function of the station multi-link device in the foregoing method 2.1. For all technical details of the station multi-link device, refer to the method 2.1. Details are not described herein again.

An embodiment of this application further provides an access point multi-link device, where the access point multi-link device includes one or more access points; the access point multi-link device receives, on one link, an information frame sent by a station in a sending state in a station multi-link device, where the information frame is used to indicate stations to which the station multi-link device is to switch for sending data, or the information frame is used to indicate links to which the station multi-link device is to switch for sending data; and the access point multi-link device sends a synchronization frame on a part of or all of the links indicated by the information frame, or on one or more links corresponding to all or a part of the stations indicated by the information frame, where the synchronization frame is used to assist all or the part of the stations in sending an uplink service.

It should be understood that the station multi-link device has any function of the station multi-link device in the foregoing method 2.2. For all technical details of the station multi-link device, refer to the method 2.2. Details are not described herein again.

An embodiment of this application provides a single radio station, where the single radio station includes one or more stations; the single radio station sends an information frame on a transmit link, where the information frame is used to indicate a target link and a switching delay of the single radio station, the target link indicates a link to which the single radio station is to switch, and the switching delay indicates how long the single radio station needs to wait for before the single radio station can work on the switched target link; and the single radio station receives a synchronization frame on the target link after the switching delay, where the synchronization frame is used to assist a station in the single radio station in quickly accessing a channel on the target link, and the station is a station corresponding to the target link.

It should be understood that the station multi-link device has any function of the station multi-link device in the foregoing method 3.1. For all technical details of the station multi-link device, refer to the method 3.1. Details are not described herein again.

An embodiment of this application further provides an access point multi-link device, where the access point multi-link device includes one or more access points; the access point multi-link device receives, on a link, an information frame sent by a single radio station, where the information frame is used to indicate a target link and a switching delay of the single radio station, the target link indicates a link to which the single radio station is to switch, and the switching delay indicates how long the single radio station needs to wait for before the single radio station can work on the switched target link; and the access point multi-link device sends a synchronization frame on the target link after the switching delay, where the synchronization frame is used to assist a station in the single radio station in quickly accessing a channel on the target link, and the station is a station corresponding to the target link.

It should be understood that the station multi-link device has any function of the station multi-link device in the foregoing method 3.2. For all technical details of the station multi-link device, refer to the method 3.2. Details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually represents an "or" relationship between the associated objects.

A person of ordinary skill in the art may be aware that, the method steps and the units described in the embodiments disclosed in this specification can be implemented by electronic hardware, computer software, or a combination thereof. To clearly describe interchangeability between the hardware and the software, the foregoing has usually described steps and compositions of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatuses, and methods may be implemented in other manners. For example, the described apparatus embodiments are merely examples. For example, division into units is merely logical function division and may be other division during actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in this application essentially, or the part contributing to a conventional technology, or all or a part of the technical solutions may be implemented in a form of a software product. The software product is stored in a storage medium and includes several instructions for instructing a computer device (which may be a personal computer, a server, a network device, or the like) to perform all or a part of the steps of the methods in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A multi-link communication method, comprising:
receiving, by a first access point in an access point multi-link device (AP MLD) from a first station in a station multi-link device (STA MLD), an information frame on a first link corresponding to the first station, wherein the information frame indicates a second station that is to send an uplink service and that loses channel state information, and wherein the second station is comprised in the STA MLD;
sending, by a second access point in the AP MLD to the second station, a downlink message frame on a second link corresponding to the second station, wherein the downlink message frame is configured to be used to assist the second station in sending the uplink service, and wherein the STA MLD does not support simultaneous transmitting and receiving; and
receiving, by the second access point, the uplink service on the second link.

2. The method according to claim 1, wherein the information frame comprises a link identifier of the second link.

3. The method according to claim 1, wherein the downlink message frame is a trigger frame.

4. The method according to claim 1, wherein the STA MLD is a single radio station.

5. An access point multi-link device (AP MLD), comprising:
at least one processor; and
a memory storing instructions that are executable by the at least one processor, wherein the program includes instructions for a first access point and a second access point of the AP MLD, and executing the instructions causes the AP MLD to:
receive, by the first access point from a first station in a station multi-link device (STA MLD), an information frame on a first link corresponding to the first station, wherein the information frame indicates a second station that is to send an uplink service and that loses channel state information, and wherein the second station is comprised in the STA MLD;
send, by the second access point to the second station, a downlink message frame on a second link corresponding to the second station, wherein the downlink message frame is configured to be used to assist the second station in sending the uplink service, and wherein the STA MLD does not support simultaneous transmitting and receiving; and
receive, by the second access point, the uplink service on the second link.

6. The AP MLD according to claim 5, wherein the information frame comprises a link identifier of the second link.

7. The AP MLD according to claim 5, wherein the downlink message frame is a trigger frame.

8. The AP MLD according to claim 5, wherein the STA MLD is a single radio station.

9. A non-transitory computer-readable storage medium, storing a computer program, wherein the computer program comprises instructions which cause an access point multi-link device (AP MLD) to:
receive, from a first station in a station multi-link device (STA MLD), an information frame on a first link corresponding to the first station, wherein the information frame indicates a second station that is to send an uplink service and that loses channel state information, wherein the second station is in the STA MLD;
send, to the second station, a downlink message frame on a second link corresponding to the second station, wherein the downlink message frame is configured to be used to assist the second station in sending the uplink service, and wherein the STA MLD does not support simultaneous transmitting and receiving; and
receive the uplink service on the second link.

10. The non-transitory computer-readable storage medium according to claim 9, wherein the information frame comprises a link identifier of the second link.

11. The non-transitory computer-readable storage medium according to claim 9, wherein the downlink message frame is a trigger frame.

12. The non-transitory computer-readable storage medium according to claim 9, wherein the STA MLD is a single radio station.

\* \* \* \* \*